US012013025B2

(12) United States Patent
Tsuchihashi

(10) Patent No.: US 12,013,025 B2
(45) Date of Patent: Jun. 18, 2024

(54) VEHICLE POWER UNIT

(71) Applicant: HONDA MOTOR CO., LTD., Tokyo (JP)

(72) Inventor: Makoto Tsuchihashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 906 days.

(21) Appl. No.: 17/050,055

(22) PCT Filed: Apr. 24, 2019

(86) PCT No.: PCT/JP2019/017452
§ 371 (c)(1),
(2) Date: Oct. 23, 2020

(87) PCT Pub. No.: WO2019/208641
PCT Pub. Date: Oct. 31, 2019

(65) Prior Publication Data
US 2021/0237567 A1 Aug. 5, 2021

(30) Foreign Application Priority Data
Apr. 26, 2018 (JP) .................................. 2018-085498

(51) Int. Cl.
*F16H 57/02* (2012.01)
*B60K 17/12* (2006.01)
(Continued)

(52) U.S. Cl.
CPC ........... *F16H 57/037* (2013.01); *B60K 17/12* (2013.01); *F16H 57/042* (2013.01);
(Continued)

(58) Field of Classification Search
CPC .. F16H 57/037; F16H 57/042; F16H 57/0424; F16H 57/043; F16H 57/0471;
(Continued)

(56) References Cited

U.S. PATENT DOCUMENTS 5,832,789 A * 11/1998 Kinto ..................... H02K 7/116
74/421 A
7,156,195 B2 * 1/2007 Yamagishi .......... F16H 57/0476
310/60 A
(Continued)

FOREIGN PATENT DOCUMENTS

CN 113452202 B * 2/2023
JP 10-278603 A 10/1998
(Continued)

OTHER PUBLICATIONS

Machine translation of JP 2001-190042 A obtained on Nov. 27, 2023.*
(Continued)

*Primary Examiner* — Adam D Rogers
(74) *Attorney, Agent, or Firm* — WHDA, LLP

(57) ABSTRACT

In a vehicle power unit, a differential gear (13) is housed in an interior of a motor housing (14) with an electric motor (11) and a reduction gear (12), an output shaft (33) extending from the differential gear (13) toward a vehicle width direction is housed in the interior of the motor housing, and an end part thereof in the vehicle width direction is supported on the motor housing via an output shaft bearing (37). Since the motor housing has a space (38) part between the electric motor and the output shaft, and oil that has lubricated the electric motor and been scattered passes the space part and is supplied to the output shaft bearing, the output shaft bearing supporting the output shaft of the differential gear can be reliably lubricated with a simple structure without forming within a wall part of the motor housing an oil passage for lubrication, without disposing in the interior of the motor housing an oil pipe for lubrication, and without carrying out lubrication using a lubricant such as a grease.

10 Claims, 3 Drawing Sheets

(51) Int. Cl.
*F16H 57/037* (2012.01)
*F16H 57/04* (2010.01)
*H02K 7/08* (2006.01)
*H02K 7/116* (2006.01)
*H02K 9/19* (2006.01)

(52) U.S. Cl.
CPC ....... *F16H 57/0424* (2013.01); *F16H 57/043* (2013.01); *F16H 57/0471* (2013.01); *H02K 7/083* (2013.01); *H02K 7/116* (2013.01); *H02K 9/19* (2013.01); *F16H 2057/02034* (2013.01)

(58) Field of Classification Search
CPC ............ F16H 2057/02034; B60K 1/00; B60K 2001/001; B60K 17/12; B60K 17/165; B60Y 2306/03; B60Y 2410/10; H02K 7/083; H02K 7/116; H02K 9/19
See application file for complete search history.

(56) References Cited

U.S. PATENT DOCUMENTS

| | | | | |
|---|---|---|---|---|
| 9,303,698 | B2* | 4/2016 | Sugiyama | F16H 57/0445 |
| 9,593,721 | B2* | 3/2017 | Strandberg | B60K 1/00 |
| 10,281,021 | B2* | 5/2019 | Ohmura | B60K 17/16 |
| 10,378,641 | B2* | 8/2019 | Nakano | F16H 48/40 |
| 10,622,864 | B2* | 4/2020 | Hiramitsu | H02K 5/225 |
| 11,137,061 | B2* | 10/2021 | Ishikawa | F16H 57/0441 |
| 11,434,977 | B2* | 9/2022 | Takahashi | F16H 1/06 |
| 11,619,297 | B2* | 4/2023 | Yu | F16H 57/0457 184/6.12 |
| 2022/0274476 | A1* | 9/2022 | Yamashita | B60K 17/165 |
| 2022/0281301 | A1* | 9/2022 | Nagaya | B60L 15/007 |
| 2022/0316582 | A1* | 10/2022 | Inoue | H02K 9/19 |
| 2023/0258250 | A1* | 8/2023 | Inoue | F16H 57/0436 475/150 |

FOREIGN PATENT DOCUMENTS

| | | | | |
|---|---|---|---|---|
| JP | 2001-190042 A | | 7/2001 | |
| JP | 2001190042 A | * | 7/2001 | ......... F16H 57/0428 |
| JP | 2006-300101 A | | 11/2006 | |
| JP | 2009-121551 A | | 6/2009 | |
| JP | 2013107536 A | * | 6/2013 | |
| JP | 2015-17672 A | | 1/2015 | |
| WO | WO-2019202945 A1 | * | 10/2019 | ............. B60K 6/36 |
| WO | WO-2019208642 A1 | * | 10/2019 | ......... F16H 57/0423 |
| WO | WO-2020067260 A1 | * | 4/2020 | |

OTHER PUBLICATIONS

International Search Report dated Jun. 18, 2019, issued in counterpart International Application No. PCT/JP2019/017452, with English Translation. (3 pages).

\* cited by examiner

VEHICLE POWER UNIT

TECHNICAL FIELD

The present invention relates to a vehicle power unit in which an electric motor and a differential gear are housed in an interior of a motor housing.

BACKGROUND ART

A vehicle power unit in which a motor case housing an electric motor and a transmission case housing a reduction gear and a differential gear are joined with a partition wall sandwiched therebetween and one of left and right output shafts of the differential gear into which the driving force of the electric motor is inputted via the reduction gear coaxially extends through the interior of a motor shaft of the electric motor and is connected to a driven wheel is known from Patent Document 1 below.

PRIOR ART DOCUMENTS

Patent Documents

Patent Document 1: Japanese Patent Application Laid-open No. 2009-121551

SUMMARY OF THE INVENTION

Problems to be Solved by the Invention

In the conventional arrangement described above, since a bearing simultaneously supporting both the motor shaft and the output shaft of the differential gear, which are fitted together coaxially, receives a large load, it is necessary to forcibly lubricate the bearing by supplying high pressure oil using an oil pump, and there is the problem that the energy loss is increased due to the lubrication.

The present invention has been accomplished in light of the above circumstances, and it is an object thereof to enable a bearing supporting an output shaft of a differential gear housed in the interior of a motor case together with an electric motor to be lubricated with a simple structure.

Means for Solving the Problems

In order to attain the above object, according to a first aspect of the present invention, there is provided a vehicle power unit in which a differential gear is housed in an interior of a motor housing that houses an electric motor having a motor shaft disposed in a vehicle width direction, the differential gear being offset toward one side in the vehicle width direction with respect to the electric motor, at least part of an output shaft extending from the differential gear toward the other side in the vehicle width direction is housed in the interior of the motor housing, and an end part, on the other side in the vehicle width direction, of the output shaft is supported on the motor housing via an output shaft bearing, wherein the motor housing has a space part between the electric motor and the output shaft, and oil that has lubricated the electric motor and been scattered passes the space part and is supplied to the output shaft bearing.

Further, according to a second aspect of the present invention, in addition to the first aspect, part of the electric motor is immersed in oil built up in a bottom part of the motor housing.

Furthermore, according to a third aspect of the present invention, in addition to the first or second aspect, an oil supply passage is formed in an interior of the motor shaft, and the electric motor is lubricated with oil supplied from the oil supply passage.

Moreover, according to a fourth aspect of the present invention, in addition to any one of the first to third aspects, an end part, on the one side in the vehicle width direction, of a gear provided on the motor shaft is positioned further toward the one side in the vehicle width direction than an end part, on the other side in the vehicle width direction, of a differential bearing supporting the other side in the vehicle width direction of a differential case on the motor housing.

Further, according to a fifth aspect of the present invention, in addition to any one of the first to fourth aspects, the output shaft bearing is positioned further toward the other side in the vehicle width direction than an end face, on the other side in the vehicle width direction, of the electric motor.

Furthermore, according to a sixth aspect of the present invention, in addition to any one of the first to fifth aspects, an end part, on the other side in the vehicle width direction, of the output shaft is equipped with an inboard joint transmitting the driving force to a driven wheel, an external diameter of the inboard joint is larger than an external diameter of the output shaft bearing, and the inboard joint is positioned further toward the other side in the vehicle width direction than an end part, on the other side in the vehicle width direction, of the electric motor.

A first reduction gear 23 of an embodiment corresponds to the gear of the present invention, an angular roller bearing 31 of the embodiment corresponds to the differential bearing of the present invention, a left output shaft 33 of the embodiment corresponds to the output shaft of the present invention, a ball bearing 37 of the embodiment corresponds to the output shaft bearing of the present invention, and an oil supply pipe 51 of the embodiment corresponds to the oil supply passage of the present invention.

Effects of the Invention

In accordance with the first aspect of the present invention, in the vehicle power unit, the differential gear is housed in the interior of the motor housing, which houses the electric motor having the motor shaft disposed in the vehicle width direction, the differential gear being offset toward one side in the vehicle width direction with respect to the electric motor, at least part of the output shaft extending from the differential gear toward the other side in the vehicle width direction is housed in the interior of the motor housing, and an end part, on the other side in the vehicle width direction, of the output shaft is supported on the motor housing via the output shaft bearing.

Since the motor housing has the space part between the electric motor and the output shaft, and oil that has lubricated the electric motor and been scattered passes the space part and is supplied to the output shaft bearing, the output shaft bearing can be reliably lubricated with a simple structure without forming within a wall part of the motor housing an oil passage for lubrication, without disposing in the interior of the motor housing an oil pipe for lubrication, and without carrying out lubrication using a lubricant such as a grease.

Furthermore, in accordance with the second aspect of the present invention, since part of the electric motor is immersed in oil built up in a bottom part of the motor housing, it is possible, by supplying oil splashed up by the electric motor to the output shaft bearing through the space part, to more reliably lubricate the output shaft bearing.

Moreover, in accordance with the third aspect of the present invention, since the oil supply passage is formed in the interior of the motor shaft, and the electric motor is lubricated with oil supplied from the oil supply passage, it is possible to lubricate effectively the entire electric motor with oil scattered by means of centrifugal force.

Furthermore, in accordance with the fourth aspect of the present invention, since an end part, on the one side in the vehicle width direction, of the gear provided on the motor shaft is positioned further toward the one side in the vehicle width direction than an end part, on the other side in the vehicle width direction, of the differential bearing supporting the other side in the vehicle width direction of the differential case on the motor housing, it is possible to reduce the dimension in the vehicle width direction of the motor housing by putting the electric motor and the differential gear closer to each other in the vehicle width direction.

Moreover, in accordance with the fifth aspect of the present invention, since the output shaft bearing is positioned further toward the other side in the vehicle width direction than an end face, on the other side in the vehicle width direction, of the electric motor, it is possible to doubly ensure the insulation distance of the electric motor and the interference-avoidance distance of the output shaft without disposing the output shaft bearing between the outer peripheral face of the electric motor and the output shaft, thus decreasing the distance between the motor shaft and the output shaft and enabling the power unit to be made small. This is because, if the output shaft were disposed outside the motor housing, it would be necessary to ensure, between the outer peripheral face of the electric motor and the output shaft, a distance corresponding to the sum of the insulation distance of the electric motor, the thickness of the wall part of the motor housing, and the interference-avoidance distance of the output shaft, but in accordance with the present invention, if only the insulation distance of the electric motor is ensured between the outer peripheral face of the electric motor and the output shaft, since the insulation distance also functions as the interference-avoidance distance of the output shaft, the distance between the motor shaft and the output shaft can be made small.

Furthermore, in accordance with the sixth aspect of the present invention, since an end part, on the other side in the vehicle width direction, of the output shaft is equipped with the inboard joint transmitting the driving force to a driven wheel, the external diameter of the inboard joint is larger than the external diameter of the output shaft bearing, and the inboard joint is positioned further toward the other side in the vehicle width direction than an end part, on the other side in the vehicle width direction, of the electric motor, it becomes unnecessary to move the output shaft radially outward away from the electric motor in order to ensure the insulation distance and the interference-avoidance distance by avoiding interference with the inboard joint, which has a large external diameter, and it becomes possible to make the distance between the motor shaft and the output shaft small.

EXPLANATION OF REFERENCE NUMERALS AND SYMBOLS

Figure 1:
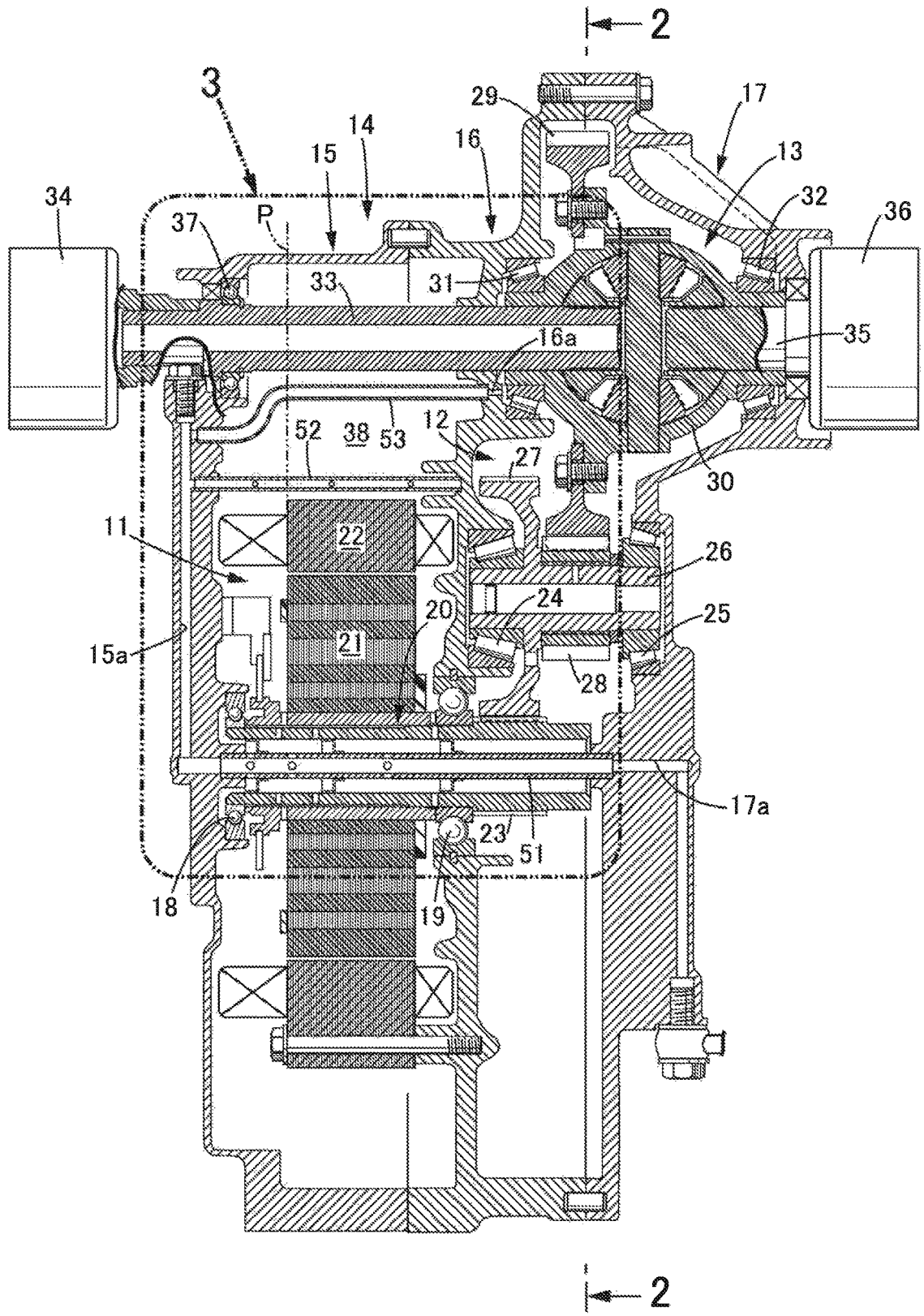
FIG. 1 is a sectional view of a power unit of an automobile (a sectional view along line 1-1 in FIG. 2). (first embodiment)

11 Electric motor
13 Differential gear
14 Motor housing
20 Motor shaft
23 First reduction gear (gear)
30 Differential case
31 Angular roller bearing (differential bearing)
33 Left output shaft (output shaft)
34 Inboard joint
37 Ball bearing (output shaft bearing)
38 Space part
51 Oil supply pipe (oil supply passage)

MODES FOR CARRYING OUT THE INVENTION

An embodiment of the present invention is explained below by reference to FIG. 1 to FIG. 3.

First Embodiment

Figure 2:
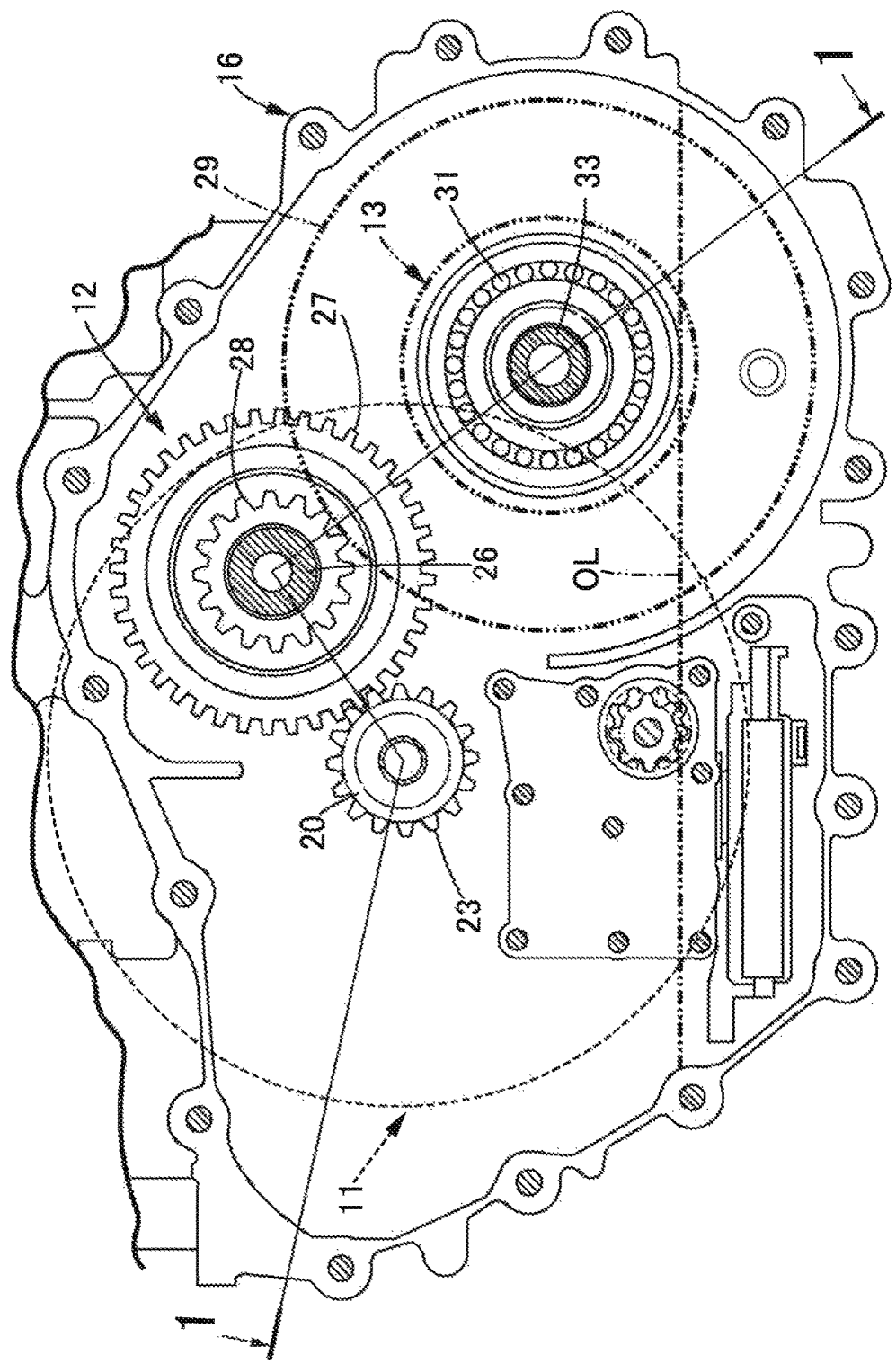
FIG. 2 is a view from arrowed line 2-2 in FIG. 1. (first embodiment)

As shown in FIG. 1 and FIG. 2, a power unit of an electric automobile includes a motor housing 14 housing in its interior an electric motor 11, a reduction gear 12, and a differential gear 13, the motor housing 14 being split into three in the vehicle width direction and formed from a left housing 15, a middle housing 16, and a right housing 17.

The electric motor 11, which is disposed between the left housing 15 and the right housing 17, includes a motor shaft 20 supported on the left housing 15 and the middle housing 16 via ball bearings 18 and 19 respectively, a rotor 21 fixed to the motor shaft 20, and a stator 22 fixed to the middle housing 16 so as to encircle the outer periphery of the rotor 21. Oil is stored in a bottom part of the motor housing 14, and a lower part of the electric motor 11 is present lower than an oil level OL (see FIG. 2) and is immersed in the oil.

The reduction gear 12, which is housed between the middle housing 16 and the right housing 17, includes a first reduction gear 23 fixedly provided on an extremity of the motor shaft 20 protruding rightward from the right housing 17, a speed reduction shaft 26 supported on the middle housing 16 and the right housing 17 via angular roller bearings 24 and 25 respectively, a second reduction gear 27 fixedly provided on the speed reduction shaft 26 and meshing with the first reduction gear 23, a final drive gear 28 fixedly provided on the speed reduction shaft 26, and a final driven gear 29 fixedly provided on the outer periphery of the differential gear 13 and meshing with the final drive gear 28.

A differential case 30 forming the outer shell of the differential gear 13, which is housed between the middle housing 16 and the right housing 17, is supported on the middle housing 16 and the right housing 17 via angular roller bearings 31 and 32 respectively, an inboard joint 34 provided at the extremity of a long left output shaft 33 extending leftward from the differential case 30 protrudes outward from the left housing 15, and an inboard joint 36 provided at the extremity of a short right output shaft 35 extending rightward from the differential case 30 protrudes outward from the right housing 17. The left inboard joint 34 is connected to a left rear wheel via a left drive shaft, which is not illustrated, and the right inboard joint 36 is connected to a right rear wheel via a right drive shaft, which is not illustrated.

The left end of the left output shaft 33 having its right end supported on the differential gear 13 is supported on the left housing 15 via a ball bearing 37. Therefore, the left output shaft 33 and the ball bearing 37 face the radially outer side of the electric motor 11 in a space part 38 formed between the left housing 15 and the middle housing 16.

Figure 3:
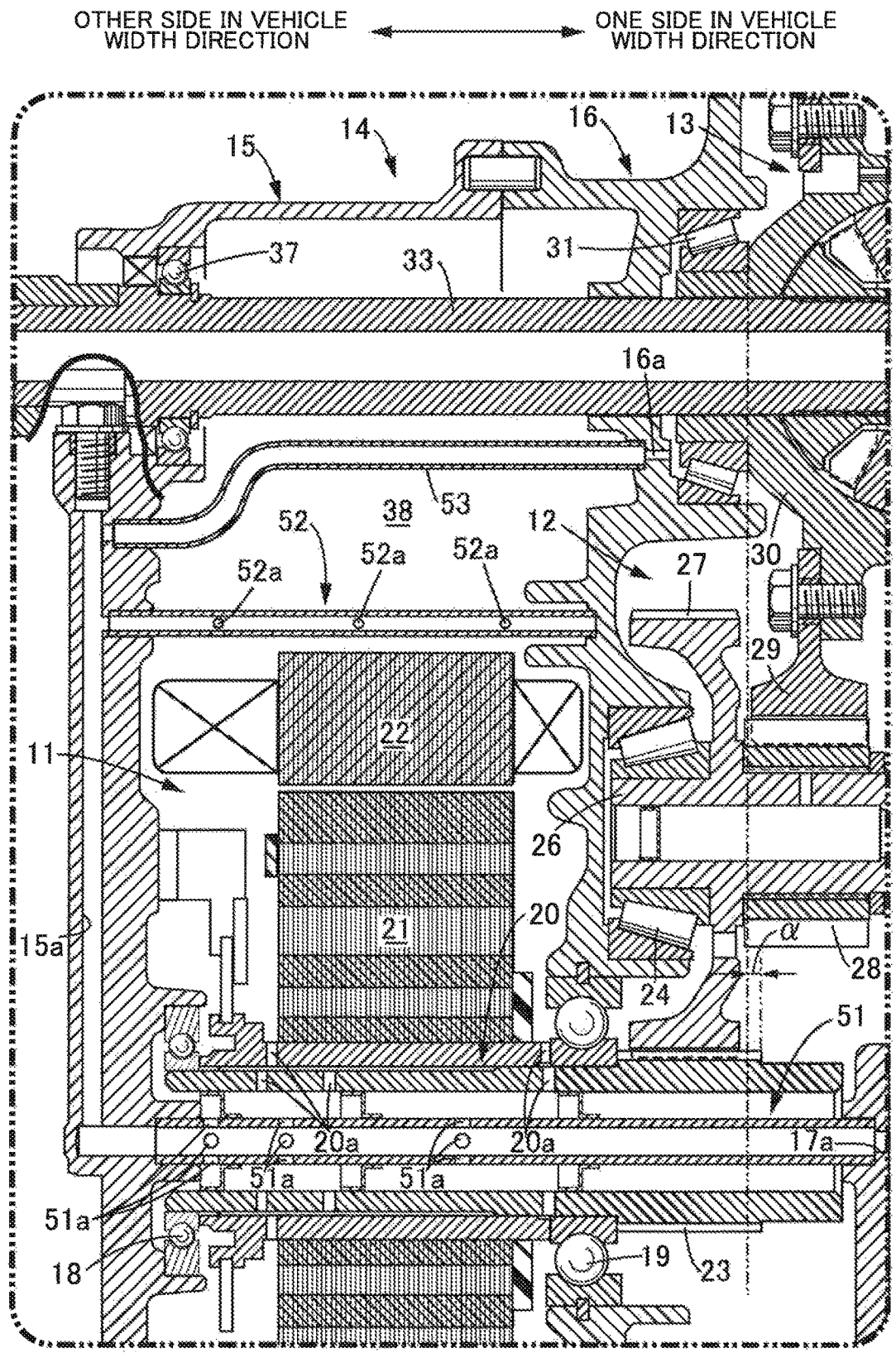
FIG. 3 is an enlarged view of part 3 of FIG. 1. (first embodiment)

As is clear from FIG. 3, an oil supply pipe 51 is coaxially fitted into the interior of the hollow motor shaft 20, the right end of the oil supply pipe 51 communicating with an oil passage 17a formed in the right housing 17 and the left end of the oil supply pipe 51 communicating with an oil passage 15a formed in the left housing 15. A plurality of oil holes Ma are formed in the oil supply pipe 51 so as to extend through in the radial direction, and a plurality of oil holes 20a are also formed in the hollow motor shaft 20, which covers the outer side of the oil supply pipe 51, so as to extend through in the radial direction.

An oil supply pipe 52 branching from the oil passage 15a of the left housing 15 extends rightward above the electric motor 11, and the right end of the oil supply pipe 52 is supported on the middle housing 16. Formed in the oil supply pipe 52 are a plurality of oil holes 52a. An oil supply pipe 53 branching from the oil passage 15a of the left housing 15 extends rightward within the space part 38, and the right end of the oil supply pipe 53 communicates with the left angular roller bearing 31, which supports the differential case 30, via an oil hole 16a of the middle housing 16.

The operation of the embodiment of the present invention having the above arrangement is now explained.

A majority of the entire length of the left output shaft 33, which is the longer one of the left output shaft 33 and the right output shaft 35 extending left and right from the differential case 30 in the vehicle width direction, is housed in the interior of the motor housing 14, and the left end thereof is supported on the left housing 15 by the ball bearing 37, thus eliminating the necessity for a special bearing support.

The oil supplied from the oil passage 17a of the right housing 17 to the oil supply pipe 51 in the interior of the motor shaft 20 of the electric motor 11 passes through the oil holes 51a of the oil supply pipe 51 and the oil holes 20a of the motor shaft 20, and is scattered radially outward by means of centrifugal force to thus cool the rotor 21 and the stator 22 of the electric motor 11 and to lubricate the left and right ball bearings 18 and 19 supporting the motor shaft 20.

The oil that has passed through the oil supply pipe 51 in the interior of the motor shaft 20 is supplied from the oil passage 15a of the left housing 15 to the oil supply pipe 52, drops down from the oil holes 52a of the oil supply pipe 52, and cools the rotor 21 and the stator 22 of the electric motor 11. Furthermore, the oil of the oil passage 15a of the left housing 15 passes through the oil supply pipe 53 and the oil hole 16a of the middle housing 16 and lubricates the left angular roller bearing 31 supporting the differential case 30 on the middle housing 16.

When the rotor 21 of the electric motor 11 having part thereof immersed in oil built up in the bottom part of the motor housing 14 rotates, the oil is splashed up into the space part 38 of the motor housing 14, and the oil that has been supplied from the oil supply pipe 51 in the interior of the motor shaft 20 and cooled the electric motor 11 is also scattered to the space part 38 by means of the rotating rotor 21. This oil lubricates the left output shaft 33 positioned on the radially outer side of the electric motor 11 and the ball bearing 37 supporting the left output shaft 33 on the left housing 15. As a result, the ball bearing 37 can be reliably lubricated without forming within a wall part of the motor housing 14 an oil passage for supplying oil to the ball bearing 37, without disposing in the interior of the motor housing 14 an oil pipe for supplying oil to the ball bearing 37, and without carrying out lubrication using a lubricant such as a grease. Moreover, it is possible to prevent the left output shaft 33 from becoming rusty without subjecting it to a special anti-corrosion treatment.

Furthermore, since a right end part of the first reduction gear 23 provided on the motor shaft 20 is positioned further rightward by a distance a (see FIG. 3) than the left angular roller bearing 31 supporting the differential case 30 on the motor housing 14, it is possible to reduce the dimension in the vehicle width direction of the motor housing 14 by putting the electric motor 11 and the differential gear 13, which are offset in the vehicle width direction, closer to each other.

A region of the electric motor 11 that is within an insulation distance from an outer peripheral face of the stator 22 is called an insulation region, and it is not desirable to dispose another member in this region. A region that is within an interference-avoidance distance from an outer peripheral face of the left output shaft 33 is called an interference-avoidance region, and it is not desirable to dispose another member in the region. Therefore, if the left output shaft 33 were disposed on the radially outer side of the left housing 15, it would be necessary to set the distance between the outer peripheral face of the stator 22 and the outer peripheral face of the left output shaft 33 to be larger than at least the sum of the insulation distance, the thickness of the wall part of the left housing 15, and the interference-avoidance distance, and there would be the problem that the distance between the motor shaft 20 of the electric motor 11 and the left output shaft 33 would increase.

On the other hand, in the present embodiment, since the ball bearing 37 is positioned further leftward than a left end face P (see FIG. 1) of the rotor 21 and stator 22 of the electric motor 11, the ball bearing 37 will not be present between the stator 22 of the electric motor 11 and the left output shaft 33. Therefore, if a distance corresponding to at least the insulation distance is ensured between the outer peripheral face of the stator 22 and the outer peripheral face of the left output shaft 33, since the distance also exhibits a function as the interference-avoidance distance of the left output shaft 33, it is possible to reduce the size of the power unit by greatly decreasing the distance between the motor shaft 20 of the electric motor 11 and the left output shaft 33.

Moreover, since the external diameter of the inboard joint 34 provided at the left end of the left output shaft 33 is larger than the external diameter of the ball bearing 37, if the inboard joint 34 were disposed on the radially outer side of the stator 22 of the electric motor 11, the distance between the stator 22 of the electric motor 11 and the wall part of the left housing 15 would decrease locally in that part, and there would be the problem that the insulation distance cannot be ensured unless the distance between the motor shaft 20 of the electric motor 11 and the left output shaft 33 is increased.

However, in accordance with the present embodiment, since the inboard joint 34 is positioned further leftward than the left end face P (see FIG. 1) of the rotor 21 and stator 22 of the electric motor 11, there is no possibility that the wall face of the left housing 15 and the inboard joint 34 will become closer to the radially outer side of the electric motor 11, and it is possible to ensure the insulation distance without increasing the distance between the motor shaft 20 of the electric motor 11 and the left output shaft 33, thereby enabling the power unit to be made small.

An embodiment of the present invention is explained above, but the present invention may be modified in a variety of ways as long as the modifications do not depart from the subject matter.

For example, the output shaft of the present invention is not limited to the left output shaft 33 of the embodiment and may be a right output shaft.

Furthermore, the output shaft bearing of the present invention is not limited to the ball bearing 37 of the embodiment and may be another type of bearing such as a roller bearing or a needle bearing.

Moreover, the differential bearing of the present invention is not limited to the angular roller bearing 31 of the embodiment and may be another type of bearing such as a roller bearing or a needle bearing.

The invention claimed is:

1. A vehicle power unit in which a differential gear is housed in an interior of a motor housing that houses an electric motor having a motor shaft disposed in a vehicle width direction, the differential gear being offset toward one side in the vehicle width direction with respect to the electric motor, at least part of an output shaft extending from the differential gear toward the other side in the vehicle width direction is housed in the interior of the motor housing, and an end part, on said other side in the vehicle width direction, of the output shaft is supported on the motor housing via an output shaft bearing,
    wherein the motor housing has a space part between the electric motor and the output shaft, and oil that has lubricated the electric motor and been scattered passes the space part and is supplied to the output shaft bearing, and
    wherein an end part, on said one side in the vehicle width direction, of a gear provided on the motor shaft is positioned further toward said one side in the vehicle width direction than an end part, on said other side in the vehicle width direction, of a differential bearing supporting said other side in the vehicle width direction of a differential case on the motor housing.

2. The vehicle power unit according to claim 1, wherein part of the electric motor is immersed in oil built up in a bottom part of the motor housing.

3. The vehicle power unit according to claim 2, wherein an oil supply passage is formed in an interior of the motor shaft, and the electric motor is lubricated with oil supplied from the oil supply passage.

4. The vehicle power unit according to claim 2, wherein the output shaft bearing is positioned further toward said other side in the vehicle width direction than an end face, on said other side in the vehicle width direction, of the electric motor.

5. The vehicle power unit according to claim 2, wherein an end part, on said other side in the vehicle width direction, of the output shaft is equipped with an inboard joint transmitting the driving force to a driven wheel, an external diameter of the inboard joint is larger than an external diameter of the output shaft bearing, and the inboard joint is positioned further toward said other side in the vehicle width direction than an end part, on said other side in the vehicle width direction, of the electric motor.

6. The vehicle power unit according to claim 1, wherein an oil supply passage is formed in an interior of the motor shaft, and the electric motor is lubricated with oil supplied from the oil supply passage.

7. The vehicle power unit according to claim 6, wherein the output shaft bearing is positioned further toward said other side in the vehicle width direction than an end face, on said other side in the vehicle width direction, of the electric motor.

8. The vehicle power unit according to claim 1, wherein the output shaft bearing is positioned further toward said other side in the vehicle width direction than an end face, on said other side in the vehicle width direction, of the electric motor.

9. The vehicle power unit according to claim 1, wherein an end part, on said other side in the vehicle width direction, of the output shaft is equipped with an inboard joint transmitting the driving force to a driven wheel, an external diameter of the inboard joint is larger than an external diameter of the output shaft bearing, and the inboard joint is positioned further toward said other side in the vehicle width direction than an end part, on said other side in the vehicle width direction, of the electric motor.

10. The vehicle power unit according to claim 9, wherein the output shaft bearing is positioned further toward said other side in the vehicle width direction than an end face, on said other side in the vehicle width direction, of the electric motor.

* * * * *